United States Patent
Meyer

(10) Patent No.: US 7,137,299 B2
(45) Date of Patent: Nov. 21, 2006

(54) FIBER OPTIC ACCELEROMETER

(75) Inventor: A. Douglas Meyer, Woodland Hills, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 11/112,203

(22) Filed: Apr. 21, 2005

(65) Prior Publication Data

US 2006/0236762 A1   Oct. 26, 2006

(51) Int. Cl.
- *G01P 15/08* (2006.01)
- *G02B 6/34* (2006.01)
- *G02B 6/00* (2006.01)

(52) U.S. Cl. ............... 73/514.27; 280/227.14; 280/227.18; 385/13

(58) Field of Classification Search ............. 73/514.26, 73/514.27, 643, 654, 656, 657; 367/178, 367/149; 385/12, 13, 37; 250/231.1, 227.14, 250/227.18; 356/477

See application file for complete search history.

(56) References Cited

U.S. PATENT DOCUMENTS

| | | | |
|---|---|---|---|
| 4,322,829 A * | 3/1982 | Davis et al. ................ 367/178 |
| 4,474,427 A | 10/1984 | Hill et al. | |
| 4,500,979 A * | 2/1985 | Scott .......................... 367/149 |
| 4,725,110 A | 2/1988 | Glenn et al. | |
| 4,800,267 A * | 1/1989 | Freal et al. ............ 250/227.16 |
| 5,317,929 A * | 6/1994 | Brown et al. ............ 73/514.01 |
| 5,426,297 A * | 6/1995 | Dunphy et al. ........ 250/227.23 |
| 5,680,489 A * | 10/1997 | Kersey ......................... 385/12 |
| 6,175,108 B1 * | 1/2001 | Jones et al. ............ 250/227.14 |
| 6,310,996 B1 | 10/2001 | Byron | |
| 6,496,264 B1 * | 12/2002 | Goldner et al. ............. 356/478 |
| 6,522,797 B1 * | 2/2003 | Siems et al. .................. 385/12 |
| 6,575,033 B1 * | 6/2003 | Knudsen et al. ......... 73/514.26 |
| 6,807,325 B1 * | 10/2004 | Kraemmer et al. ........... 385/13 |
| 6,836,592 B1 | 12/2004 | Mead et al. | |
| 6,901,176 B1 * | 5/2005 | Balachandran et al. ....... 385/12 |
| 6,921,894 B1 * | 7/2005 | Swierkowski .......... 250/227.21 |

* cited by examiner

*Primary Examiner*—Helen Kwok
(74) *Attorney, Agent, or Firm*—Lynn & Lynn

(57) ABSTRACT

A proof mass is suspended in a cavity in a housing. The proof mass moves along a sensing axis in response to linear acceleration. Elastic support members are connected between the proof mass and the housing and are arranged to exert a reaction force on the proof mass in response to displacement of the proof mass along the sensing axis. An optical fiber is connected between the proof mass and opposite sidewall portions of the housing such that displacement of the proof mass along the sensing axis elongates a first portion of the optical fiber and shortens another portion. An optical signal source provides a broadband optical signal input to the optical fiber. A fiber optic Bragg grating is formed in the optical fiber and arranged to reflect a portion of the optical signal. Acceleration of the proof mass modulates the wavelength of the reflected optical signal.

6 Claims, 3 Drawing Sheets

FIBER OPTIC ACCELEROMETER

BACKGROUND OF THE INVENTION

This invention relates generally to techniques for measuring acceleration and particularly to a fiber optic device for measuring linear acceleration.

Previous attempts to provide a fiber optic device that is sensitive to linear acceleration have involved microoptic techniques for fabricating individual components. Such techniques are labor intensive and therefore expensive.

SUMMARY OF THE INVENTION

The present invention provides a highly accurate fiber optic acceleration sensor that is inexpensive to manufacture using holographic techniques.

An acceleration sensor, according to the present invention comprises a housing having a cavity therein with a proof mass suspended within the cavity. The proof mass is arranged to move along a sensing axis in response to linear acceleration along the sensing axis. A plurality of elastic support members is connected between the proof mass and the housing. The elastic support members are arranged to exert a reaction force on the proof mass in response to displacement of the proof mass along the sensing axis. An optical fiber has a first portion connected between a first side of the proof mass and a first sidewall portion of the housing and a second portion connected between a second side of the proof mass and a second sidewall portion of the housing such that displacement of the proof mass along the sensing axis elongates one of the first and second portions of the optical fiber and shortens the other. An optical signal source is arranged to provide a broadband optical signal input to the optical fiber. A fiber optic Bragg grating is formed in the optical fiber and arranged to reflect a portion of the optical signal. The reflected portion has a wavelength that is modulated by acceleration of the proof mass along the sensing axis. The reflected signal may be processed to determine the acceleration of the proof mass.

The acceleration sensor according to the present invention may further comprise a first fiber optic Bragg grating formed in the first portion of the optical fiber; and a second fiber optic Bragg grating formed in the second portion of the optical fiber, the first and second fiber optic Bragg gratings being arranged such that they reflect different wavelengths $\Lambda_1$ and $\Lambda_2$, respectively, to produce a wavelength difference $\Lambda_1 \Lambda_2$ that may be processed to determine the acceleration of the proof mass.

A plurality of acceleration sensors according to the present invention may be combined in a variety of array structures to provide the capability of measuring acceleration at a plurality of locations with a region defined by such an array.

DETAILED DESCRIPTION OF THE INVENTION

Figure 1:
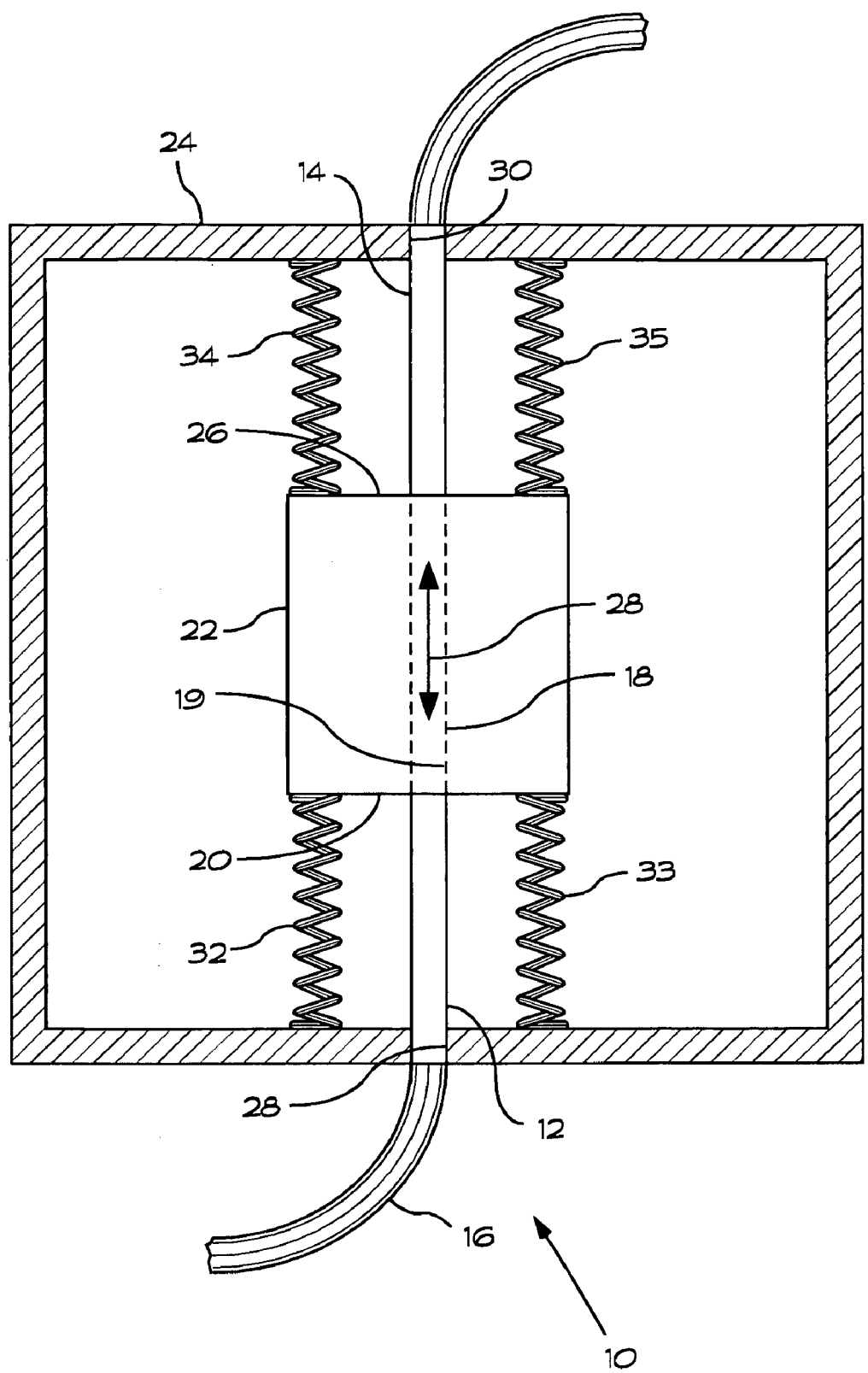
FIG. 1 is a cross sectional view showing an acceleration sensor according to the present invention.

As shown in FIG. 1, a fiber optic acceleration sensor 10 includes two Fiber Bragg Gratings (FBGs) 12 and 14 working in a push pull manner. The FBGs 12 and 14 are formed in an optical fiber 16.

The FBG 12 is connected between a first side 20 of a proof mass 22 and a housing 24. The FBG 12 is connected between the housing 24 and a second side 26 of the proof mass 22 that is opposite the first side 20. The FBG 12 is secured to the housing 24 by any suitable means such as adhesive bonding in a passage 28. The FBG 14 is secured to the housing 24 by any suitable means such an adhesive bonding in a passage 30. A portion 18 of the optical fiber 16 is secured to the proof mass 22 by any suitable means such as being adhesively secured inside a passage 19 through the proof mass 22 or in a groove (not shown). The proof mass 22 is supported within the housing 24 by a plurality of elastic members 32–35. The elastic members may be formed as springs as shown or as lengths of any suitable elastomeric material.

Suitable structures and fabrication techniques for forming the FBGs 12 and 14 are well known in the art. The FBGs 12 and 14 may be produced by forming a periodic or a periodic perturbation in the index of refraction in selected lengths 15 and 17 of the optical fiber 16. The index perturbation primarily affects the core (or guiding region) of the optical fiber 16. There are several ways in which a suitable perturbation may be generated. The most common way is to capitalize on the photosensitivity of optical fibers containing particular dopant materials. It has been discovered that germania-doped silica optical fiber is sensitive to exposure to argon ion laser radiation and that a two-photon absorption at 488 nm was responsible for the effect. The early research lead to holographic writing methods that presently are used to fabricate FBG devices as disclosed in U.S. Pat. No. 4,725,110 to Glenn, et al; U.S. Pat. No. 6,836,592 to Mead et al.; U.S. Pat. No. 6,310,996 to Byron; and U.S. Pat. No. 4,474,427 to Hill et al., the disclosures of which are incorporated by reference into the present disclosure.

UV-light is caused to interfere, either by use of a phase mask, prism interferometer, or other method. The interfered light is apertured and focused on the core region of an optical fiber. The interference pattern formed on the core is a series of bright and dark bands, whose spacing can be either equidistant or chirped. The former case will form a highly period grating pattern, while the later will generate an a periodic (or chirped) pattern. The bright bands interact with the doped core material and cause an index of refraction change to occur in the immediate area exposed to the light while the areas under the dark bands remain unaffected. It is this that gives rise to the periodic index perturbation. By changing the interference period, the grating period, $\Lambda_g$, is changed in turn changing the wavelength that is reflected or transmitted through the FBG filter. The strength of the index perturbation will govern the transmission and reflection characteristics of the FBG.

Referring again to FIG. 1, the formed FBGs 12 and 14 can then be used as reflection or rejection filters for a specific optical wavelength. The particular wavelength $\lambda_{Bragg}$ that is acted upon by the FBG is governed by the period of the index perturbation and can be expressed to the first order as $$\lambda_{Bragg} = 2\Lambda_g \eta_{eff} \tag{1}$$

where $\eta_{eff}$ is the effective index of refraction of the optical fiber, and $\Lambda_g$ is the period of the index perturbation.

FBGs can be fabricated as either reflective or transmissive devices. The device described here will work with either type of grating.

To form the acceleration (or vibration) sensor, the FBGs 12 and 14 are used in tandem and configured in a push-pull manner. In this configuration it is not a requirement for the FBGs 12 and 14 to be matched in wavelength when in a static environment because the important element for detection is the wavelength difference between the two FBGs 12 and 14 in the dynamic environment and not the their absolute wavelength shifts.

The proof mass is allowed to move within the sensor housing 24 when excited by acceleration or vibration with damping provide by the springs 32–35. The FBGs 12 and 14 are rigidly attached to the proof mass 22 and the sensor case 24. When the proof mass 22 is excited and caused to move, the FBGs 12 and 14 are alternately placed into tension and compression. Placing an FBG into tension causes the grating period $\Lambda_g$, to become larger; and, when under compression, the grating period becomes smaller. The shift in grating period therefore drives the wavelength that is filtered by the grating as can be seen by application of Equation 1.

The signals that are returned for processing are modulated in wavelength. By taking the relative time-dependent wavelength differences from the two returns, the original vibration (acceleration) signature can be found. An advantage of this configuration is that the sensitivity of the device is increased by 2 over that using a single FBG. This comes about because a percentage strain in one FBG causes a corresponding percentage change in wavelength. Using the two FBGs 12 and 14 in a difference configuration yields twice the sensitivity for the same given strain. The wavelength difference signal s then $$\Delta\lambda = 2\eta_{eff}(\Lambda_{g1} - \Lambda_{g2}). \quad (2)$$

Another advantage of this configuration is that it is temperature insensitive. This again comes from the fact that only the relative difference in wavelength change between the two FBGs 12 and 14 is used and not the absolute value. The expression for the wavelength shift in an FBG due to temperature is:

$$\lambda_b(T) = 2\Lambda_g(1 + \alpha[T_1 - T_2])\left(\eta_{eff} + \frac{d\eta_{eff}}{dT}[T_1 - T_2]\right). \quad (3)$$

The expression for the wavelength difference between the two FBGs can be written as $$\Delta\lambda(T) = 2\Lambda_{g,1}(1 + \alpha[T_1 - T_2])\left(\eta_{eff} + \frac{d\eta_{eff}}{dT}[T_1 - T_2]\right) - \quad (4)$$
$$\Lambda_{g,2}(1 + \alpha[T_1 - T_2])\left(\eta_{eff} + \frac{d\eta_{eff}}{dT}[T_1 - T_2]\right),$$

where $\alpha$ is a temperature expansion coefficient of the FBG. Equation 4 can be simplified to $$\Delta\lambda(T) = 2(\Lambda_{g,1} - \Lambda_{g,2})(1 + \alpha[T_1 - T_2])\left(\eta_{eff} + \frac{d\eta_{eff}}{dT}[T_1 - T_2]\right).$$

where the temperature terms behave only a static offset to the wavelength differences, therefore not affecting the dynamic performance of the sensor.

Figure 2:
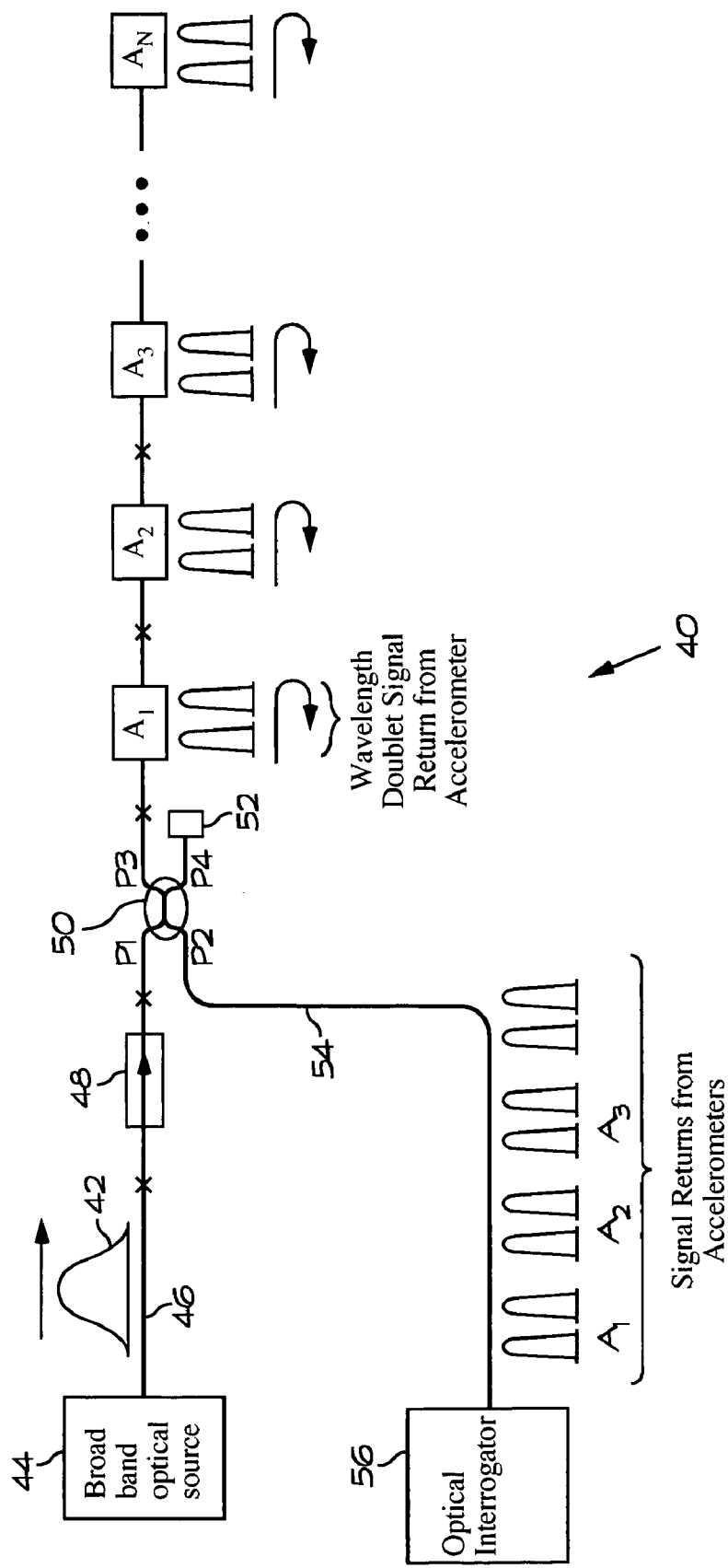
FIG. 2 illustrates a first sensor array that includes a plurality of acceleration sensors according to the present invention.

FIG. 2 shows a first sensor array 40 that may include a plurality of fiber optic acceleration sensors $A_1, A_2, \ldots A_N$ formed accordance with FIG. 1 and the foregoing description thereof. The array 40 is a linear array that receives an optical signal 42 from a broadband optical signal source 44. The input optical signal 42 propagates through an optical fiber 46 to an optical isolator 48 that prevents propagation in the reverse direction.

The input optical signal 42 then propagates to an optical coupler 50 that is arranged to have ports P1–P4. The input optical signal 42 is input to port P1 of the optical coupler 50. Part of the optical signal 42 input to the optical coupler 50 is cross-coupled to be output at port P4 where the cross-coupled signal is absorbed by and absorber 52. The portion of the input optical signal 42 that remains in the optical fiber 46 is output from the optical coupler 50 at port P3 for input to the acceleration sensors $A_1, A_2, \ldots A_N$. Each of the acceleration sensors $A_1, A_2, \ldots A_N$ returns a wavelength doublet signal back to the optical coupler 50. Each doublet signal returned indicates acceleration of the corresponding acceleration sensor.

The doublet signal returns are guided by the optical fiber back to the optical coupler 50, which couples the doublet signal returns from port P3 for output to an optical fiber 54 at port P2. The optical fiber 54 guides the doublet signal returns to an optical wavelength interrogator 56 for wavelength processing to extract the desired acceleration information.

Figure 3:
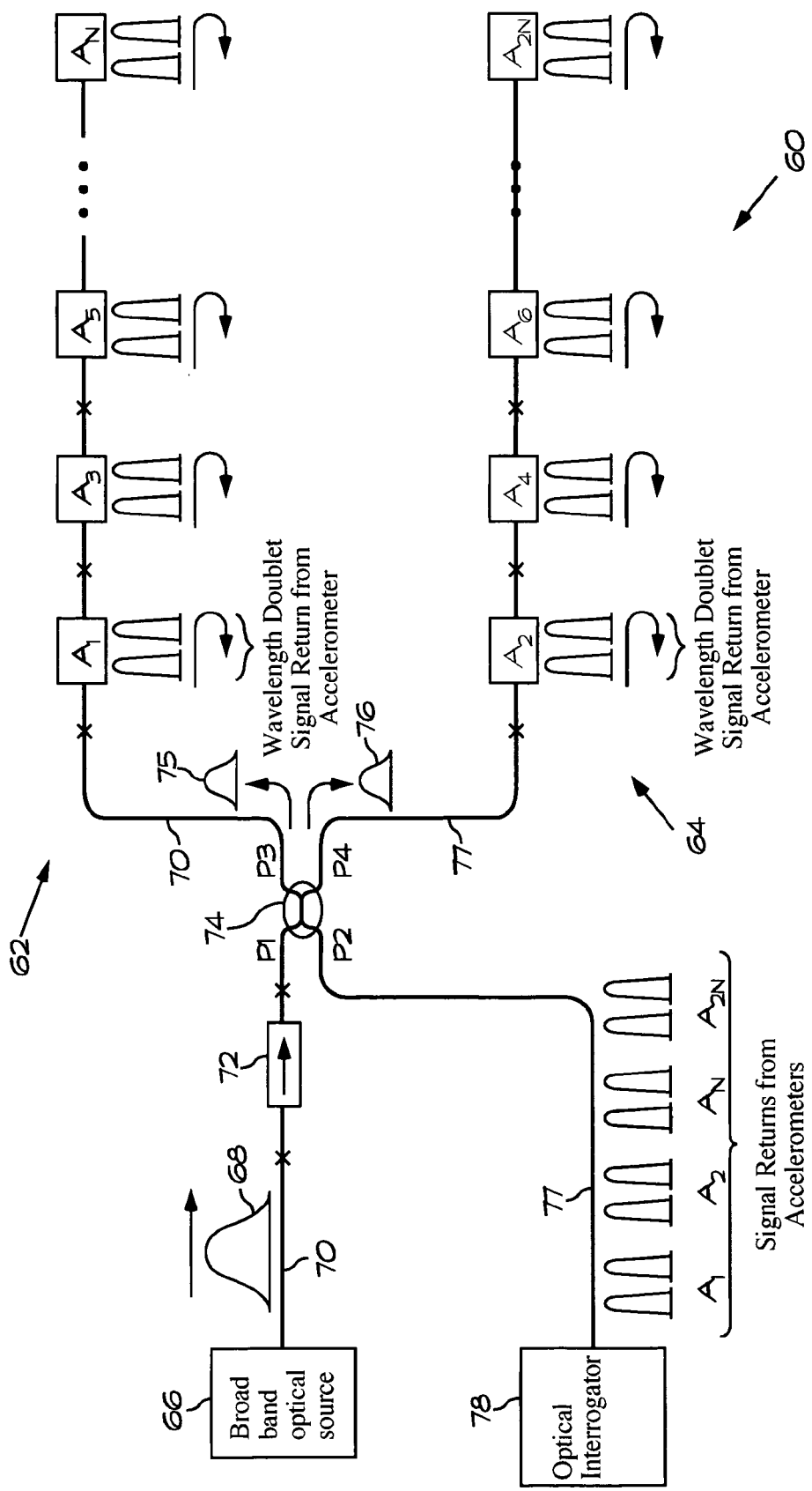
FIG. 3 illustrates a second sensor array that includes a plurality or acceleration sensors according to the present invention.

FIG. 3 shows a second sensor array 60 that includes a linear array 62 that is similar to the array 40 of FIG. 1 and a linear array 64, which is also similar to the array 40. A broadband optical signal source 66 provides an optical signal 68 to an optical fiber 70 that is arranged to guide the input signal to an optical isolator 72. The input optical signal propagates through the optical isolator 72 to an optical coupler 74 that has ports P1–P4. A first portion 75 of the input optical signal remains in the optical fiber 70 and is output from the optical coupler at port P3 for input to array 62 that includes a plurality of acceleration sensors $A_1$, $A_3, \ldots A_N$. A second portion 76 of the input optical signal cross-couples from port P1 to port P3 into an optical fiber 77 for input to the array 64 that includes a plurality of acceleration sensors $A_2, A_4, \ldots A_{2N}$.

The array 62 produces a first set of doublet signal returns that propagate back to the optical coupler 74 where they are cross-coupled to port P2 and into the optical fiber 77. The array 64 produces a second set of doublet signal returns that return to the optical coupler 74 where they propagate from port P4 to port P2. Both sets of doublet signal returns propagate in the optical fiber 77 to an optical interrogator 78 that processes the doublet signal returns to obtain numerical data for the acceleration at each acceleration sensor in the arrays 62 and 64.

What is claimed is:

1. An acceleration sensor, comprising:
a housing having a cavity therein;
a proof mass suspended within the cavity, the proof mass being arranged to move along a sensing axis in response to linear acceleration along the sensing axis;
a plurality of elastic support members connected between the proof mass and the housing, the elastic support members being arranged to exert a reaction force on the proof mass in response to displacement of the proof mass along the sensing axis;

an optical fiber having a first portion connected between a first side of the proof mass and a first sidewall portion of the housing and a second portion connected between a second side of the proof mass and a second sidewall portion of the housing such that displacement of the proof mass along the sensing axis elongates one of the first and second portions of the optical fiber and shortens the other;

an optical signal source arranged to provide a broadband optical signal input to the optical fiber; and a fiber optic Bragg grating formed in the first portion of the optical fiber such that acceleration of the proof mass along the sensing axis produces a strain in the fiber optic Bragg grating, the fiber optic Bragg grating, being arranged to reflect a portion of the optical signal, the reflected portion having a wavelength that is modulated by the strain caused by acceleration of the proof mass along the sensing axis.

2. The acceleration sensor of claim 1 wherein the proof mass is constrained to move only along the sensing axis.

3. An acceleration sensor comprising:

a housing having a cavity therein;

a proof mass suspended within the cavity, the proof mass being arranged to move along a sensing axis in response to linear acceleration along the sensing axis;

a plurality of elastic support members connected between the proof mass and the housing, the elastic support members being arranged to exert a reaction force on the proof mass in response to displacement of the proof mass along the sensing axis;

an optical fiber having a first portion connected between a first side of the proof mass and a first sidewall portion of the housing and a second portion connected between a second side of the proof mass and a second sidewall portion of the housing such that displacement of the proof mass along the sensing axis elongates one of the first and second portions of the optical fiber and shortens the other;

an optical signal source arranged to provide a broadband optical signal input to the optical fiber;

a first fiber optic Bragg grating formed in the first portion of the optical fiber such that acceleration of the proof mass along the sensing axis produces a strain in the first fiber optic Bragg grating; and a second fiber optic Bragg grating formed in the second portion of the optical fiber such that acceleration of the proof mass along the sensing axis produces a strain in the second fiber optic Bragg grating, the first and second fiber optic Bragg gratings being arranged to reflect different wavelengths $\Lambda_1$ and $\Lambda_2$, respectively, in response to an acceleration of the proof mass along the sensing axis to produce a wavelength difference $\Lambda_1-\Lambda_2$ that may be processed to determine the acceleration of the proof mass along the sensing axis.

4. An acceleration sensing system comprising:

an optical signal source arranged to provide broadband optical signals;

a first optical fiber arranged to receive broadband optical signals from the broadband optical signal source;

an optical coupler arranged to include the first optical fiber;

a second optical fiber arranged such that the optical coupler couples optical signals between the first and second optical fibers;

a first array of acceleration sensors formed with the first optical fiber, each acceleration sensor comprising:

a housing having a cavity therein:

a proof mass suspended within the cavity, the proof mass being arranged to move along a sensing axis in response to linear acceleration along the sensing axis;

a plurality of elastic support members connected between the proof mass and the housing, the elastic support members being arranged to exert a reaction force on the proof mass in response to displacement of the proof mass along the sensing axis;

a first portion of the first optical fiber connected between a first side of the proof mass and a first sidewall portion of the housing and a second portion of the first optical fiber connected between a second side of the proof mass and a second sidewall portion of the housing such that displacement of the proof mass along the sensing axis elongates one of the first and second portions of the optical fiber and shortens the other; and a fiber optic Bragg grating formed in the first portion of the first optical fiber such that acceleration of the proof mass along the sensing axis produces a strain in the fiber optic Bragg grating, the fiber optic Bragg grating, being arranged to reflect a portion of the optical signal, the reflected portion having a wavelength that is modulated by the strain caused by acceleration of the proof mass along the sensing axis;

the optical coupler being arranged to couple signals reflected from each acceleration sensor into the second optical fiber; and an optical interrogator arranged to receive signals guided by the second optical fiber.

5. The acceleration sensor of claim 4 wherein each acceleration sensor in the first array comprises:

a first fiber optic Bragg grating formed in the first portion of the optical fiber; and a second fiber optic Bragg grating formed in the second portion of the optical fiber, the first and second fiber optic Bragg gratings being arranged to reflect different wavelengths $\Lambda_1$ and $\Lambda_2$, respectively, in response to an acceleration of the proof mass along the sensing axis to produce a wavelength difference $\Lambda_1-\Lambda_2$ that may be processed to determine the acceleration of the proof mass.

6. The acceleration sensing system of claim 5 wherein the optical coupler is arranged to divide the broadband optical signal from the optical signal source equally between the first optical fiber and the second optical fiber with a second acceleration sensor array of acceleration sensors identical to the acceleration sensors in the first acceleration sensor array being formed to include the second optical fiber such that signals reflected by the second sensor array propagate in the second optical fiber to the optical interrogator.

* * * * *